United States Patent

Meinzer et al.

[11] Patent Number: 5,865,959
[45] Date of Patent: Feb. 2, 1999

[54] BACK-SIDE ILLUMINATED ORGANIC POLLUTANT REMOVAL SYSTEM

[75] Inventors: Richard A. Meinzer, Glastonbury; Timothy N. Obee, South Windsor, both of Conn.; Pamela J. Curbelo, Sturbridge, Mass.

[73] Assignee: United Technologies Corporation, Hartford, Conn.

[21] Appl. No.: 738,148

[22] Filed: Oct. 25, 1996

Related U.S. Application Data

[63] Continuation-in-part of Ser. No. 448,012, May 23, 1995, abandoned.

[51] Int. Cl.⁶ ................ B01J 19/08; B01J 8/00
[52] U.S. Cl. ................ 204/157.3; 204/157.44; 422/166.3; 423/245.3
[58] Field of Search .............. 204/157.3, 157.44, 204/157.47, 157.48; 423/245.3; 422/160.3

[56] References Cited

U.S. PATENT DOCUMENTS

| | | | |
|---|---|---|---|
| 4,892,712 | 1/1990 | Robertson et al. | 422/186 |
| 4,954,465 | 9/1990 | Kawashima et al. | 502/5 |
| 4,966,665 | 10/1990 | Ibusuki et al. | 204/157.3 |
| 4,966,759 | 10/1990 | Robertson et al. | 422/186 |
| 5,032,241 | 7/1991 | Robertson et al. | 204/157.15 |
| 5,035,784 | 7/1991 | Anderson et al. | 204/158.14 |
| 5,045,288 | 9/1991 | Raupp | 422/186.3 |
| 5,078,971 | 1/1992 | Matuda et al. | 422/121 |
| 5,308,454 | 5/1994 | Anderson | 204/59 R |
| 5,564,065 | 10/1996 | Flock et al. | 422/186.3 |

FOREIGN PATENT DOCUMENTS

| | | |
|---|---|---|
| 0 306 301 A1 | 3/1989 | European Pat. Off. . |
| 0 499 363 A1 | 8/1992 | European Pat. Off. . |
| 42 41 451 A1 | 12/1993 | Germany . |
| 44 10 476 A1 | 10/1994 | Germany . |
| 2-107314 | 4/1990 | Japan . |
| 3-94814 | 4/1991 | Japan . |
| 3-233100 | 10/1991 | Japan . |
| 5-17153 | 1/1993 | Japan . |
| WO 89 02418 A1 | 3/1989 | WIPO . |
| WO 91 09823 A1 | 7/1991 | WIPO . |
| WO 95 03261 A | 2/1995 | WIPO . |

OTHER PUBLICATIONS

The First International Conference, 8–13 Nov. 1992, Cover Sheet, Table of Contents, pp. 1–9, "$TiO_2$ Photocatalytic Purification And Treatment Of Water And Air".

"Mechanisms And By–Products Of The $TiO_2$ Mediated Photo–Oxidation Of Trichloroethylene And Tetrachlorethylene In Aqueous Solutions", *William H. Glaze*, John F. Kenneke and John L. Ferry, pp. 39–40.

"Application Of Thin Film $TiO_2$ Photocatalyst: Lighting System With Deodorizing Function", *Kazuhito Hashimoto* and *Akira Fujishima*, pp. 190–191.

"An Interior–Finishing Material With An Odor Control Function Coated By A Photocatalytic $TiO_2$ Thin Film", *Takatoshi Ogawa*, Toshio Saito, Tamotsu Hasegawa, Hiroshi Shinozaki, Kazuito Hashimoto and Akira Fujishima, pp. 192–193.

(List continued on next page.)

*Primary Examiner*—Gary P. Straub
*Attorney, Agent, or Firm*—Pamela J. Curbelo

[57] ABSTRACT

Illumination of the back-side of a UV transparent medium significantly reduces the decomposition of organic pollutants to carbon dioxide while significantly increasing the amount of radiation available for catalysis of the organic pollutants by a photocatalytic semiconductor. The UV light illuminates the UV transparent medium such that the UV propagates through the medium, illuminating the back-side of a photocatalytic semiconductor coating on the front-side. The photocatalytic semiconductor dissociates water on its surface to form hydroxyl radicals which in turn oxidize organic pollutants.

12 Claims, 4 Drawing Sheets

OTHER PUBLICATIONS

"Photocatalytic Activity Of $Tio_2$ Thin Film Under Room Light", *Toshiya Watanabe*, Atushi Kitamura, Eiichi Kojima, Chiaki Nakayama, Kazuhito Hashimoto and Akira Fujishima, pp. 202–203.

J. Phys. Chem., 1987, 91, pp. 3328–3333, "Photooxidation of Organic Impurities in Water Using Thin Films of Titanium Dioxide", Ralph W. Matthews.

Solar Energy Materials 14, 1986, pp. 121–127, "Photocatalysis Over $Tio_2$ Supported On A Glass Substrate", Nick Serpone, Enrico Borgarello, Ron Harris, Paul Cahill and Mark Borgarello.

J. Phys. Chem., 1988, 92, pp. 5726–5731, "Kinetic Studies in Heterogeneous Photocatalysis. 1. Photocatalytic Degradation of Chlorinated Phenols in Aerated Aqueous Solutions over $Tio_2$ Supported on a Glass Matrix", Hussain Al–Ekahi and Nick Serpone.

Chemtech, May 1993, Research, 8 pages, "Supported titania for photodegradation", Walter A. Zeltner, Charles G. Hill, Jr., Marc A. Anderson.

Environmental Science & Technology, Jan. 1995, 43 pp. "Development and Optimization of a $Tio_2$ —Coated Fiber Optic Cable Reactor: Photocatalytic Degradation of 4—Chlorophenol", Nicola J. Peill and Michael R. Hoffann.

Journal of Catalysis, 136, 1992, pp. 554–565, "Heterogeneous Photocatalytic Oxidation of Gas–Phase Organics for Air Purification: Acetone, 1—Butanol, Butyraldehyde, Formaldehyde, and m–Xylene Oxidation", Jose Peral and David F. Ollis.

Journal of Molecular Catalysis, 00, 1993, 10 pages, Elsevier Science Publishers B.V., Amsterdam, "Removal of low concentration nitrogen oxides through photoassisted heterogeneous catalysis", Takashi Ibusuki et al.

International Search Report for PCT/US96/05866, mailed Dec. 6, 1996, for the PCT application that corresponds to United States Application 08/448,012 (Abandoned).

fig.1 fig.2 fig.3 fig. 6

BACK-SIDE ILLUMINATED ORGANIC POLLUTANT REMOVAL SYSTEM

This is a continuation-in-part application of patent application Ser. No. 08/448,012, filed May 23, 1995, now abandoned.

TECHNICAL FIELD

The present invention relates to the oxidation of organic pollutants, and especially relates to employing back-side illumination of a photocatalytic semiconductor in the oxidation of organic pollutants.

BACKGROUND OF THE INVENTION

Volatile organic compounds including low molecular weight gases, condensable vapors, environmental tobacco smoke, bio-aerosols, among others, including, but not limited to, 1,3-butadiene, formaldehyde, acetaldehyde, benzene, toluene, acetone, methyl-ethyl ketone, hydrogen sulfide, triethylamine, pthalates, mineral oils, volatile fire retardants, etc. and irritants such as pollens or fungus spores, which are commonly referred to as organic pollutants, often constitute both a comfort concern and health hazard in an enclosed environment. Conventionally active cleaning systems such as filters, thermal catalytic beds and others, remove these organic pollutants from the environment. These systems, however, are neither energy nor cost efficient due to the pressure drop across the system or the energy required for thermal oxidation, the post conditioning of the air to acceptable temperatures, and the limited life of these systems.

Figure 1:
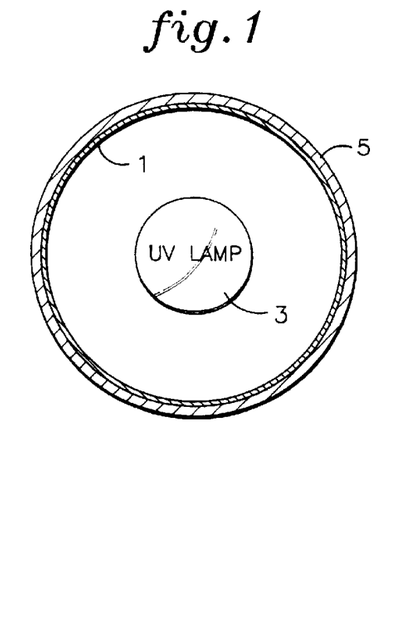
FIG. 1 is a top view of an organic pollutant removal system utilizing front-side illumination.

Another type of cleaning system for removing organic pollutants utilizes ultra-violet (UV) to illuminate and thereby activate a photocatalytic semiconductor. In these systems the organic pollutant contacts the active surface (1), which is directly illuminated by the UV lamp (3), and is oxidized by hydroxyl radicals which have been formed thereon; "front-side" illumination. (see FIG. 1) With front-side illumination, the illumination area is limited to the "line-of-sight" of the illumination source, is inefficient due to light scattering from particulate matter between the source and the surface, and unsafe due to the potential optical hazard. An additional problem with front-side illumination can be the formation of poisonous gas, carbon monoxide, caused by the UV gas phase decomposition of some of the organic pollutants above the photocatalytic semiconductor coated substrate.

What is needed in the art is a system for safely, efficiently and effectively removing organic pollutants from a closed environment while reducing the amount of undesirable by-products.

DISCLOSURE OF THE INVENTION

The present invention relates to a device and method for oxidizing organic pollutants. The back-side of a UV transparent medium having a photocatalytic semiconductor coated front-side, is illuminated with UV by at least one UV source. Upon the introduction of water and the organic pollutants to said photocatalytic semiconductor coating, the water dissociates to form hydroxyl radicals which oxidize the organic pollutants.

One device of the present invention is a conical UV transparent medium having a photocatalytic semiconductor coating on its surface. A UV source is located at the first end of the medium such that UV propagates through said UV transparent medium which converges from said first end. This UV transparent medium may be hollow or solid and may have a reflective means on its inner surface or at the second end.

The foregoing and other features and advantages of the present invention will become clear from the following description and drawings.

BEST MODE FOR CARRYING OUT THE INVENTION

Figure 2:
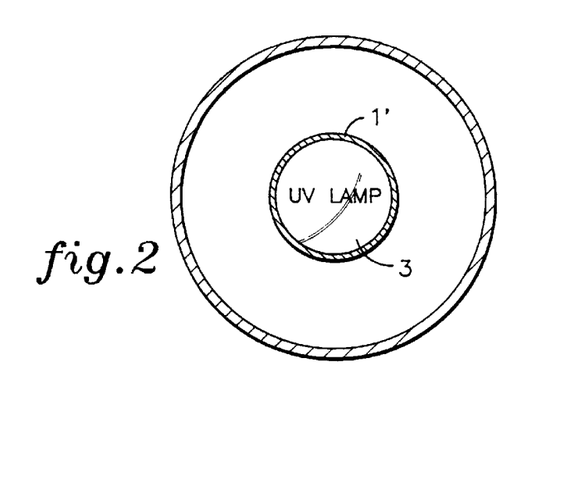
FIG. 2 is a top view of one embodiment of the back-side organic pollutant removal system of present invention where a photocatalytic semiconductor coats a UV lamp.

The present invention comprises a method and system for removing organic pollutants from a closed environment such as a room or the interior of a vehicle, etc. Essentially, organic pollutants contact a photocatalytic semiconductor coating on an UV transparent medium. UV lamp (3) illuminates the coating (1'), the "back-side", thereby activating the photocatalytic semiconductor. (see FIG. 2) Note, in this particular embodiment, the coating (1') can either be located directly on the UV lamp (3) or on a UV transparent medium surrounding the UV lamp. The photocatalytic semiconductor then cracks water molecules on its surface, forming hydroxyl radicals which oxidize the organic pollutants.

The photocatalytic semiconductor is a compound activated by light within its band gap and capable of dissociating water molecules to form hydroxyl radicals which oxidize the organic pollutants. Some such photocatalytic semiconductors include metal oxides such as: tin dioxide ($SnO_2$), titanium dioxide ($TiO_2$), zinc oxide (ZnO), tungsten trioxide ($WO_3$), lead oxide (PbO), iron titanium trioxide ($FeTiO_3$), vanadium pentoxide ($V_2O_5$), iron oxide ($Fe_2O_3$), and others such as cadmium sulfide (CdS). Preferably the photocatalytic semiconductor has an optical absorption band close to visible light, is not readily poisoned by compounds in air such as organic pollutants, and does not itself readily oxidize or evaporate. One such photocatalytic semiconductor is TiO$_2$ which is inexpensive, stable, environmentally sound, resistant to poisoning, and readily activated by ultraviolet (UV) with wavelengths less than about 400 nanometers (nm).

Utilization of substantially all of the surface of the UV transparent medium with activated photocatalytic semiconductor enhances the efficiency of the system. The UV transparent medium can be any substrate which transmits UV, propagates the UV through the substrate to excite the coating, and to which the photocatalytic semiconductor coating can adhere.

One factor which effects UV propagation is the respective refractive indices of the coating and UV transparent medium. In order to propagate UV through the UV transparent medium, a portion of the UV should be confined within the UV transparent medium such that the confined UV reflects off the sides of the UV transparent medium, moving through that medium, and activating subsequent portions of the photocatalytic semiconductor coating. If the refractive index of the photocatalytic semiconductor coating is greater than that of the UV transparent medium, the UV transfers out of the substrate into the photocatalytic coating where it is absorbed. Consequently, when UV is transmitted through one of the potential UV transparent mediums listed in Table 1 below, for example, the UV will not be contained within the UV transparent medium and is therefore not available to activate subsequent areas of the coating. As a result, for ordinary communication fiber which is commonly used in the prior art (diameter about 10 microns ($\mu$) to about 100$\mu$), the length which can be efficiently illuminated to perform photocatalytic processing is typically limited to a few inches, i.e. about 2 to 3 inches. Therefore, the size and efficiency of a prior art organic pollutant removal system are similarly limited based upon the refractive indices.

TABLE 1

(UV wavelength of about 400 nm)

| Material | Refractive Index |
|---|---|
| Quartz | 1.47 |
| MgO | 1.77 |
| MgF | 1.38 |
| Sapphire (Aluminum Oxide) | 1.79 |
| $TiO_2$ | 2.80 |
| Air | 1.00 |
| $H_2O$ | 1.33 |

Factors which can significantly reduce the effects of the refractive index ratio at the interface include: diameter of the UV transparent medium, geometry, and reflectivity. The diameter of the UV transparent medium should be based upon the size restrictions of the system, the obtainable efficiency, and therefore, the length of coated UV transparent medium necessary to oxidize the given amount of organic pollutant in a given time. The back-side of the photocatalytic semiconductor coating can be illuminated, and therefore activated, in two fashions: direct, line-of-sight illumination, and reflection illumination. Increasing the diameter of the UV transparent medium improves the amount of coating visible via the line-of-site of the UV source. line-of-sight UV availability reduces reliance upon the reflection of the UV off of the UV transparent medium-photocatalytic semiconductor coating interface in the activation of subsequent portions of the photocatalytic semiconductor coating. Diameters (or thicknesses) of about 1 millimeter (mm) or greater are typically preferred since an active fiber length of about 12 inches (26.4 centimeters (cm)) or more can be obtained, while larger diameter fibers can have even longer active lengths.

As with the diameter, the adjustment of the geometry can improve the line-of-sight availability of UV. Possible geometries include: tubular, flat, conical, and/or triangular, where the substrates can be either hollow or solid. Conical fibers and triangular plates with the UV source oriented such that the UV illuminates the converging surface maximizes the amount of UV reaching the areas of the coating furthest from the UV source.

If the UV transparent medium is additionally hollow, reflection illumination, as well as line-of-sight illumination, combine in the activation of the photocatalytic semiconductor coating. Although reflection from the inner surface will not directly excite the photocatalytic semiconductor coating, it assists in the distribution of the UV within the UV transparent medium, while the portion of UV which transmits through the medium to the coating-medium interface excites the photocatalytic semiconductor coating. When UV reflects from this surface, a portion of the evanescent wave propagates out of the UV transparent medium into the photocatalytic semiconductor coating. This evanescent wave can propagate about one wavelength into the photocatalytic semiconductor coating and thereby excite it. The reflection capabilities of the hollow UV transparent medium can be enhanced by coating the internal surface and or end of the hollow medium opposite the UV source, with a reflective coating, such as aluminum, to tailor the amount of UV reaching the photocatalytic semiconductor coating on the UV transparent medium's exterior.

Reflective coatings or surfaces can also be utilized with solid UV transparent mediums on the end of the medium opposite the UV source such that UV reaching the end of the substrate reflects back through the substrate towards the UV source. The mixing of the forward and backward moving beams produces a more uniform UV distribution and photoactivation of the photocatalytic semiconductor coating. A partially reflective coating/surface could also be located between the UV transparent medium and the photocatalytic semiconductor coating to further assist in the propagation of UV through the medium and more uniform distribution throughout the medium. Use of the reflective coatings also enables variations in the types and geometries of the organic pollutant removal systems. For example, the fibers can be curved, or "bent" to allow the system to be utilized in a confined space. The reflective means would assist in propagating the UV light through the fiber.

Some possible UV transparent mediums include glass such as quartz, ceramic, and crystals such as magnesium oxide ($MgO_2$), magnesium fluoride ($MgF_2$), and sapphire ($Al_2O_3$), and others in the shape of fibers, light pipes, conical fibers, plates, beads, rods, and others. Fibers, rods, light pipes, plates, and similar conceptual designs are generally preferred because they are capable of utilizing a minimum number of UV sources to transmit UV to a large coating area.

As is shown in FIG. 3, for example, a plate (31) can be coated with a photocatalytic semiconductor coating (33) on both sides and on three of the edges. The UV source (35) illuminates the uncoated edge of the plate (37) such that UV transmits through the plate (31) to the back-side of the coating (33) on the sides and remaining three edges, thereby maximizing the available activated coating area.

Coating the UV transparent medium with the photocatalytic semiconductor can be accomplished by various coating processes such as a sol-gel process as disclosed in co-pending U.S. patent application Ser. No. 08/448,010 (incorporated herein by reference), colloidal suspension, spray coating techniques, and others. For example, anatase and water can be mixed to form a mixture, the mixture is acidified to inhibit agglomeration of the photocatalytic semiconductor particles therein, and a surfactant is added to reduce surface tension. The mixture is then emulsified and the UV transparent medium is coated therewith via conventional techniques such as dipping, painting, spraying, spin coating, etc., up to a thickness of about 20 microns ($\mu$) or more, with up to about $10\mu$ preferred, and about $0.25\mu$ to about $5.0\mu$ especially preferred for most applications. The maximum allowable coating thickness depends upon the ability of the UV to activate the photocatalytic semiconductor coating; if the coating is too thick the UV will not sufficiently penetrate enough of the coating to sufficiently activate substantially all of the photocatalytic semiconductor, including the surface of the coating. Once applied, the coating is dried using hot or cool air, or UV prior to use. (see co-pending U.S. patent application Ser. No. 08/448,147; incorporated herein by reference.)

Figure 3:
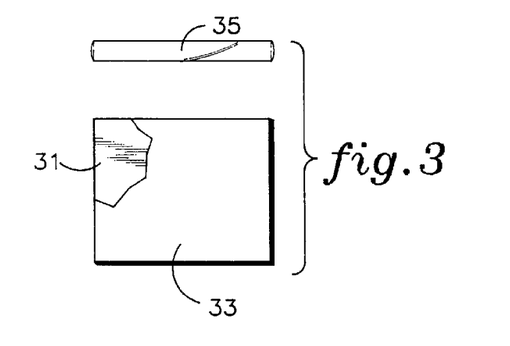
FIG. 3 is a side view of another embodiment of the present invention where a photocatalytic semiconductor coats a UV transparent plate on five sides while a UV lamp illuminates the 6th side to transmit UV through the plate to the back-side of the coating.
Figures 4A, 4B:
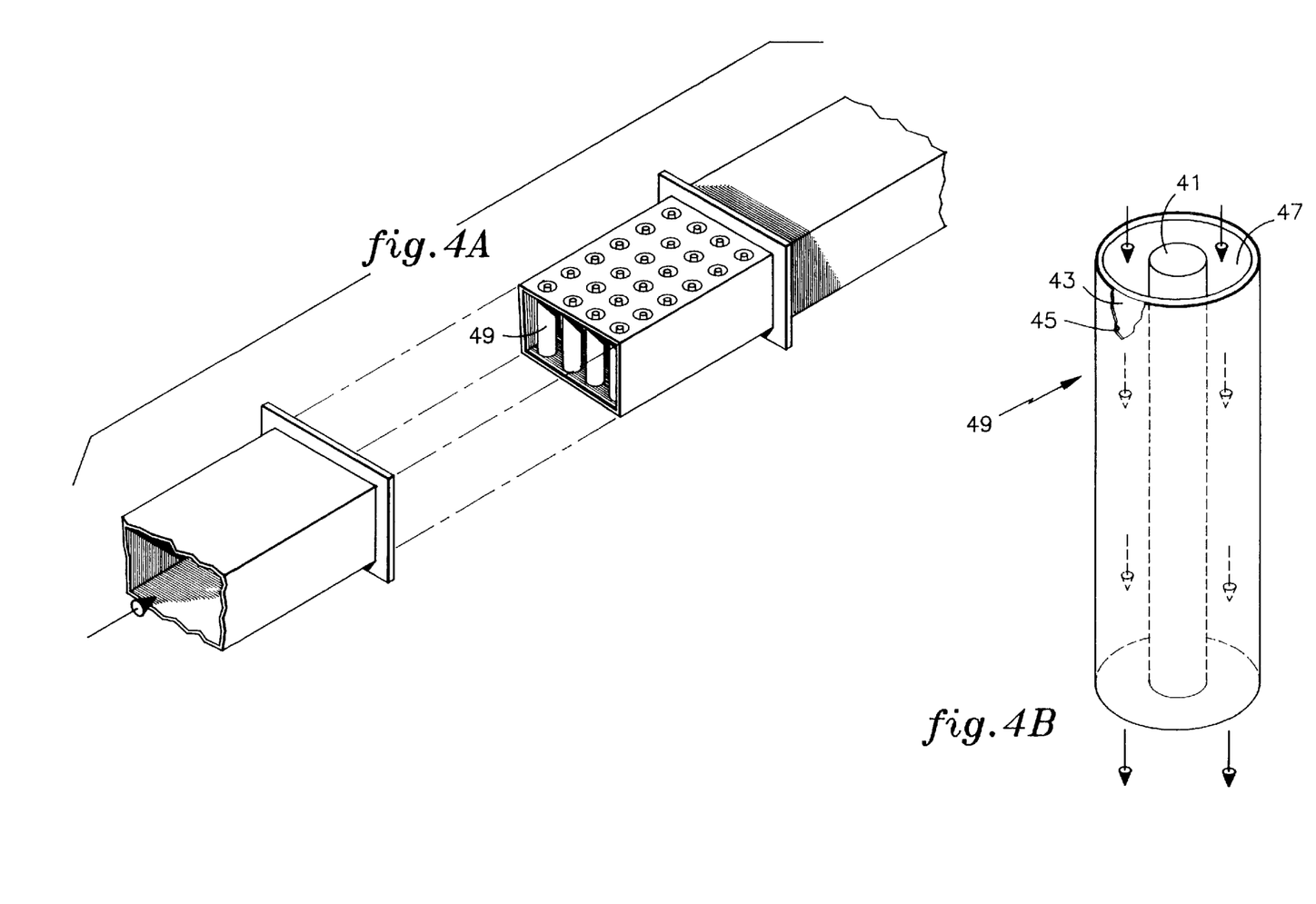
FIG. 4A is a schematic of another embodiment of the present invention wherein organic pollutants in a ventilation duct are oxidized utilizing back-side illumination.
FIG. 4B is a partially cut away side view of one element from the system of FIG. 4A which employs a UV lamp co-axially disposed within a UV transparent medium having a photocatalytic semiconductor coating on its outer surface.

The coated UV transparent medium can be utilized in a number of configurations. The plate (31) of FIG. 3, for example, can be converted to a triangular geometry and utilized in parallel or series with other triangular plates. Referring to FIGS. 4A, 4B, 5A, and 5B, which are meant to be exemplary not limiting, back-side illumination is shown in a variety of different possible embodiments. One system which can be employed in a ventilation duct (FIG. 4A), for example, where the organic pollutants would flow around numerous photocatalytic modules (49) is show in FIG. 4B. FIG. 4B reveals a side view of a system where the UV lamp (41) is located within a UV transparent medium (43) having a photocatalytic semiconductor coating (45) on its outer surface. This figure additionally shows a temperature control passage (47) which can employ various fluid means such as nitrogen, water, or other non-UV absorbing fluid, among others.

The temperature control passage (47) controls the amount of thermal energy transferred from the UV lamp (41) to the photocatalytic semiconductor coating, and therefore controls the temperature of the photocatalytic semiconductor coating (45). Control of the temperature of the photocatalytic semiconductor coating is based upon the organic pollutant affinity for adsorption on the photocatalytic semiconductor coating relative to water. If the organic pollutant has a greater affinity for the photocatalytic semiconductor coating than water, reducing the temperature of the coating increases the amount of organic pollutant oxidized. If the organic pollutant has an affinity for the photocatalytic semiconductor coating which is less that of water, increasing the temperature of the coating will increase the amount of organic pollutant oxidized.

For example, ethylene, which is non-polar, has a lower affinity for adsorption on a $TiO_2$ coating than water. Consequently, it is preferred to maintain the temperature of the photocatalytic semiconductor coating at a temperature which reduces the amount of water on the surface such that more reactive sites will be available for ethylene. Depending upon the humidity of the gas stream, this temperature is often about 20° C. to about 50° C., with about 30° C. to about 40° C. preferred. In contrast to ethylene, formaldehyde has a greater affinity for a $TiO_2$ coating than water. Consequently, it is preferred to maintain a low temperature such that the residence time of the formaldehyde on the coating is increased. As the temperature of the coating increases the residence time of the substances, organic pollutants and water, on the coating is reduced. This reduction, however, disproportionately affects the substances based upon their affinity for adsorption. The substance having the greater affinity is more affected by the temperature increase than the substance with the lesser affinity. It is desirable to control the temperature of the coating to favor the organic pollutant. If the organic pollutant has a greater affinity than water, the temperature should be low, i.e. ambient temperature or below, while if the organic pollutant has a lesser affinity than water, the temperature should be maintained higher, typically above ambient temperature (about 20° C.).

Figures 5A, 5B:
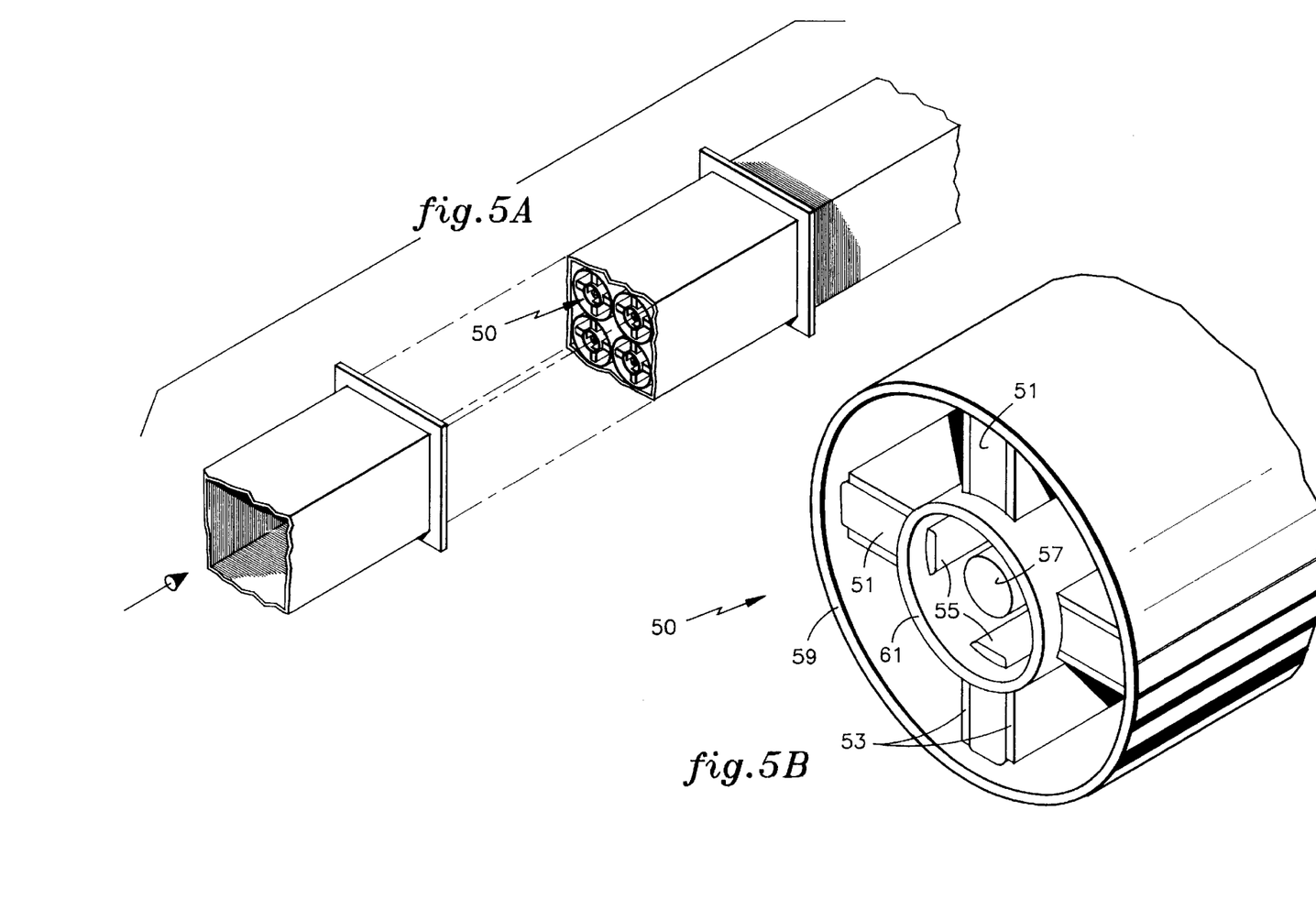
FIG. 5A is another embodiment for the utilization of the present invention in a duct.
FIG. 5B is an exploded view of one element from the system of FIG. 5A which utilizes a UV lamp disposed within a UV opaque tube with UV transparent mediums protruding therethrough such that UV can be transmitted to the back-side of a photocatalytic semiconductor coating covering the UV transparent medium on the opposite side of the UV opaque tube.

In another embodiment, exemplified in FIG. 5B, a group of UV transparent mediums (51), coated with the photocatalytic semiconductor (53), are substantially evenly disposed within a flow tube (59), perpendicular to the inner surface thereof, with an end (55) of the UV transparent mediums (51) protruding through and perpendicular to a UV opaque tube (61) concentrically disposed within the flow tube (59). Concentric and coaxial with, and disposed within the UV opaque tube (61) is the UV lamp (57) such that the UV lamp (57) can illuminate the UV transparent mediums (51) to transmit UV to the photocatalytic semiconductor coating (53). This system can additionally utilize various temperature control techniques such as heat transfer fins and or a coolant passage for water or gas. Furthermore, the UV opaque tube (61) can be replaced with a UV transparent, infrared filter which will allow the transmission of UV while inhibiting the heating of the gaseous stream. Some possible conventional UV transparent, infrared filters include water filters, UV band pass filters, beam splitters, and others which may employ thin film coatings to block the infrared and are produced by companies such as Oriel Corporation, Stratford, Conn.

Removal of organic pollutants employing back-side illumination comprises illumination of the uncoated end or edge of a UV transparent medium. The UV then travels through the medium either illuminating the back-side of the photocatalytic semiconductor coating directly (without reflecting off of the coating-medium interface) or reflecting off of the interface or inner surface (for a hollow medium) and, thereby activating the photocatalytic semiconductor. Meanwhile, the photocatalytic semiconductor dissociates water on its surface to form hydroxyl radicals which oxidize organic pollutants contacting the photocatalytic semiconductor coating to form water, carbon dioxide, and minor amounts of by-products.

If the reactivity of the photocatalytic semiconductor decreases it is preferred to halt the flow of the organic pollutant while continuing to illuminate the coating, thereby regenerating the photocatalytic semiconductor coating by oxidizing organic pollutants which are poisoning it. Note, conventional regeneration techniques can also be employed such as washing with a mild acid solution.

Figure 6:
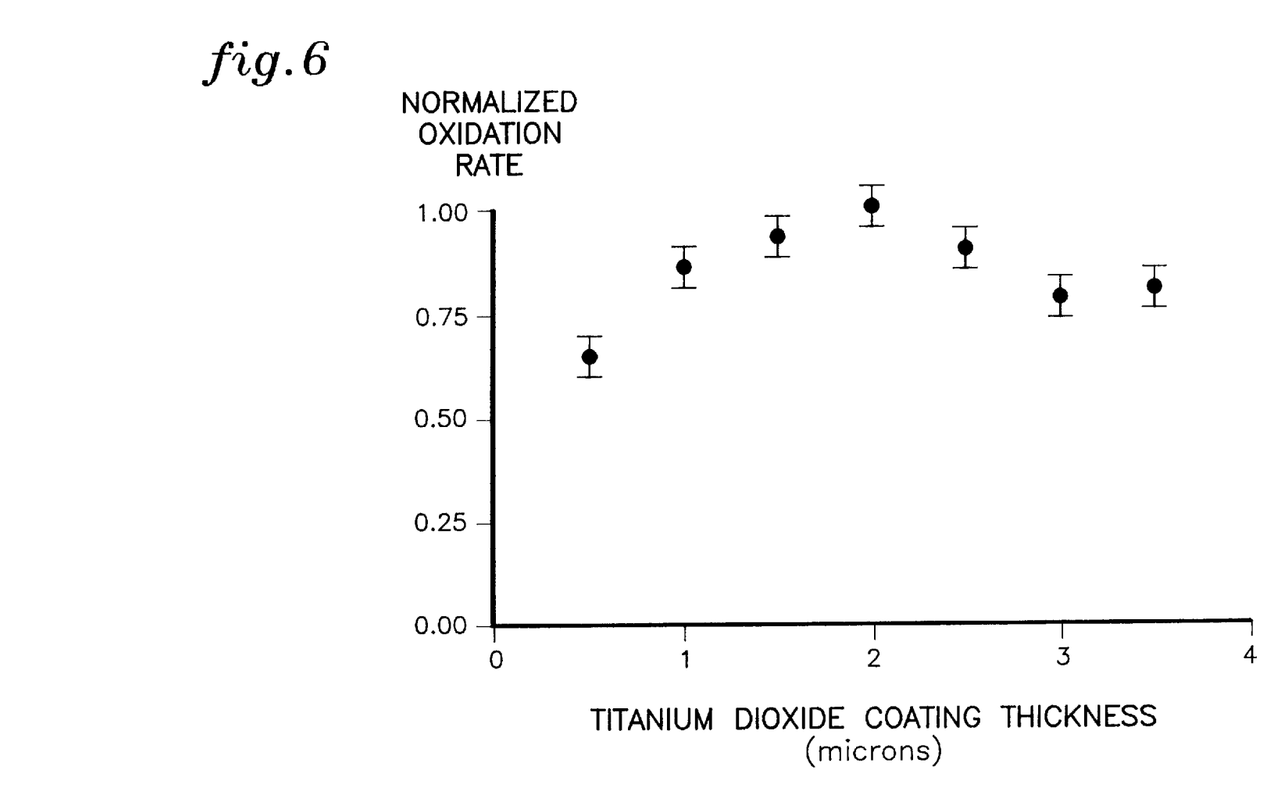
FIG. 6 is a graph of the oxidation rate of formaldehyde based as a function of coating thickness.

FIG. 6 shows the relative performance of UV illuminated $TiO_2$ coated 1 mm diameter quartz rods as a function of coating thickness. The advantage of using the $TiO_2$ coated rods is that the rod length and spacing between the rods can be easily modified to fill a given volume. An additional advantage of the coated rods is that the UV lamps can be temperature controlled externally, thereby eliminating supplemental cooling of the rods within the reaction chamber. Consequently, the system is simplified in relation to both an internally cooled UV lamp and an internally gas cooled UV lamp, and potentially even more efficient. Furthermore, dilution of the organic pollutant stream prior to oxidation in the internally gas cooled system is eliminated.

Back-side illumination allows for simplified organic pollutant removal system configurations while reducing the amount of UV available for the gas phase decomposition of the organic pollutants by at least six orders of magnitude. Reduction of gas phase decomposition similarly reduces the amount of carbon monoxide produced in the removal of the organic pollutants to insignificant levels; below about 0.01 ppmv.

Unlike the present invention, the prior art liquid phase organic pollutant removal was not concerned about fiber diameter, oxidation chemistry, or organic pollutant density. Fundamental differences exist in the oxidation chemistry of contaminated gas (e.g., air) versus liquid (e.g., water) remediation by titania photooxidation. For example, pH of the liquid plays a critical role in liquid titania photooxidation, but is irrelevant in gas titania photooxidation. Water vapor level plays a major role in gas titania photooxidation, but is irrelevant in liquid-titania photooxidation. Diffusion rates in the bulk influence mass transfer rates to the titania surface, and yet are vastly different (several orders of magnitude) in gases and liquids. Furthermore, oxygen plays a fundamentally different role in gas-titania versus liquid-titania applications. Since adsorbed oxygen acts as an electron trap for the photogenerated electron-hole pair, the low absorption of oxygen in water results in adsorbed oxygen acting as the rate limiting step in water applications. For air contaminated gas streams, the oxidation rate is independent of oxygen levels above 0.1–1.0% for low contaminant concentrations (i.e., less than 500 ppm). Hence, in contrast to liquid remediation, for gaseous remediation the rate controlling mechanism is some factor(s) other than oxygen level. Consequently, performance in prior art liquid remediation cannot be used as a guide for the gaseous remediation.

Additional advantages of the present invention include improved safety since the UV source illuminates the backside, there is less of a likelihood of unwanted exposure to UV or carbon monoxide formation from UV decomposition of the organic pollutants; improved efficiency since a given size UV source is now capable of illuminating a greater area of coating (i.e. by transmitting the UV through a rod, fiber or plate) than attainable with front-side illumination; and back-side illumination allows for simplified, more compact organic pollutant removal systems can utilize reflective means and employ refractive index ratio and UV transparent medium size to activate the photocatalytic semiconductor coating, thereby removing reliance upon the "line-of-sight" of the UV source.

We claim:

1. A method for oxidizing organic pollutants in a gaseous stream, comprising:
   a. employing a UV transparent medium having a photocatalytic semiconductor coating, wherein said photocatalytic semiconductor coating has a temperature relative to a reference temperature, the reference temperature being substantially at ambient of about 20° C.;
   b. illuminating said UV transparent medium such that UV passes through said UV transparent medium to illuminate said photocatalytic semiconductor coating,
   c. controlling said temperature of said photocatalytic semiconductor coating to reduce said coating temperature relative to the reference to temperature in those cases where the organic pollutant has a greater affinity for said photocatalytic semiconductor coating than water and, conversely, to increase said coating temperature relative to the reference temperature in those cases where the organic pollutant has an affinity for said photocatalytic semiconductor coating which is less than that of water;
   d. introducing the gaseous stream containing water and at least one organic pollutant to said photocatalytic semiconductor coating;
   e. photocatalytically dissociating said water to form hydroxyl radicals; and
   f. oxidizing said organic pollutant.

2. A method for oxidizing as in claim 1 wherein said coating temperature is controlled by controlling the transfer of thermal energy from said UV source to said photocatalytic semiconductor coating.

3. A device for oxidizing organic pollutants in a gaseous stream, comprising:
   a. a UV transparent medium having an outer surface;
   b. a photocatalytic semiconductor coating on the outer surface of the UV transparent medium, said coating having a temperature relative to a reference temperature, the reference temperature being substantially at ambient of about 20° C.;
   c. a UV source oriented such that UV light from said UV source passes through said UV transparent medium to illuminate said photocatalytic semiconductor coating;
   d. means for passing a gaseous stream containing water and at least one organic pollutant in contact with said photocatalytic semiconductor coating to photocatalytically dissociate said water to form hydroxyl radicals and oxidize said organic pollutant; and
   e. means for controlling the temperature of said photocatalytic semiconductor coating to reduce said coating temperature relative to the reference temperature in those cases where the organic pollutant has a greater affinity for said photocatalytic semiconductor coating than water and, conversely, to increase said coating temperature relative to the reference temperature in those cases where the organic pollutant has an affinity for said photocatalytic semiconductor coating which is less than that of water.

4. A device as in claim 3 wherein said transparent medium is hollow, said UV source is positioned at least partly internal to said hollow transparent medium and said means for controlling the temperature of said coating controls the transfer of thermal energy from said UV source to said photocatalytic semiconductor coating.

5. A device for oxidizing organic pollutants in a gaseous stream, comprising:
   a. a UV transparent medium having a first end that diverges from a second end, an outer surface with a photocatalytic semiconductor coating; and
   b. a UV source oriented at said first end such that UV light from said UV source propagates through said UV transparent medium to activate said photocatalytic semiconductor coating.

6. A device as in claim 5 wherein said UV transparent medium has a conical or triangular shape.

7. A device as in claim 6 wherein said UV transparent medium is hollow.

8. A device as in claim 7 wherein said UV transparent medium has an inner surface with a partially reflective coating to reflect a portion of the UV through said UV transparent medium.

9. A device has in claim 5 wherein said UV transparent medium as a reflective means at said second end for reflecting the UV light.

10. A device as in claim 5 wherein said UV transparent medium has a partially reflective coating between said outer surface and said photocatalytic semiconductor coating.

11. A device as in claim 10 wherein said UV transparent medium has a curved geometry.

12. A device as in claim 5 wherein said photocatalytic semiconductor is titanium dioxide, tin oxide, cadmium sulfide, tungsten trioxide, or zinc oxide.

* * * * *